United States Patent [19]
Simon et al.

[11] Patent Number: 4,791,658
[45] Date of Patent: Dec. 13, 1988

[54] INTEGRATED ALARM AND TOUCH TONE TELEPHONE SYSTEM

[75] Inventors: Theodore Simon, 35 Melrose Rd., Dix Hills, N.Y. 11746; Lance Weston, Farmingdale; George P. Berg, Hicksville, both of N.Y.

[73] Assignees: Theodore Simon, Dix Hills; Barry D. Schweiger, Melville, both of N.Y.

[21] Appl. No.: 883,709
[22] Filed: Jul. 9, 1986
[51] Int. Cl.$^4$ ............................................. H04M 11/04
[52] U.S. Cl. ....................................... 379/41; 379/42; 379/104; 379/413
[58] Field of Search ................ 174/2 A, 2 AM, 2 BC, 174/5 R, 5 P, 27 G, 40, 70, 77, 99 A; 379/32, 33, 39–44, 51, 77, 102, 104–107, 159, 176, 320, 324, 413

[56] References Cited

U.S. PATENT DOCUMENTS

| | | | |
|---|---|---|---|
| 3,925,622 | 12/1975 | Robinson | 179/5 P X |
| 4,095,050 | 6/1978 | Beachem et al. | 179/2 A |
| 4,097,690 | 6/1978 | Kuntz et al. | 179/2 A |
| 4,121,053 | 10/1978 | Dick | 179/2 A |
| 4,122,305 | 10/1978 | Fish et al. | 179/2 A X |
| 4,130,732 | 12/1978 | Giovagoni | 179/5 R |
| 4,371,751 | 2/1983 | Hilligoss, Jr. et al. | 179/5 R |
| 4,383,138 | 5/1983 | Castro et al. | 179/2 A X |
| 4,387,272 | 6/1983 | Castro et al. | 379/77 |
| 4,393,277 | 7/1983 | Besen et al. | 179/2 A |
| 4,393,278 | 7/1983 | Miyoshi | 179/2 A X |
| 4,459,434 | 7/1984 | Benning et al. | 179/2 A X |
| 4,489,438 | 12/1984 | Hughes | 179/2 A X |
| 4,510,350 | 4/1985 | Wagner et al. | 179/5 P |
| 4,538,031 | 8/1985 | Benning et al. | 179/2 A X |
| 4,546,211 | 10/1985 | Fane, III | 179/2 A |
| 4,546,213 | 10/1985 | Dick | 179/2 A |
| 4,547,630 | 10/1985 | Giammarrusco | 179/2 A X |
| 4,549,044 | 10/1985 | Durham | 179/5 R |
| 4,558,181 | 12/1985 | Blanchard et al. | 179/5 P |
| 4,578,540 | 3/1986 | Borg et al. | 179/2 A |
| 4,584,434 | 4/1986 | Hashimoto | 379/105 X |

OTHER PUBLICATIONS

Fire Burglary Instruments, Inc., Hauppauge, N.Y., "... with Voice Response Secur-Fone You'll Have the Edge," Brochure, ©1985.
Fire Burglary Instruments, Inc., Hauppauge, N.Y., "Secur-Fone, Security Made Simple," Brochure PN-S-F-1800-SL, ©1986.
Butler National Corp., Lenexa, Kansas, "ADAS II Talking Automatic Dialer" Operation/Maintenance Manual, Revision O, Sep. 1982.
Capital Controls Company, Inc., Colmar, Pa., "Advance Series 1520 Automatic Dialing Alarm Monitor," Instruction Manual, Pub. No. 385-2, ©1985.

*Primary Examiner*—Keith E. George
*Attorney, Agent, or Firm*—Scully, Scott, Murphy & Presser

[57] ABSTRACT

A microprocessor controlled integrated alarm and touch tone telephone system which allows the alarm system to be accessed, programmed, and reported upon through a touch tone telephone, either locally or remotely. Under most circumstances, the telephones on the premises can be operated in a normal manner. However, the alarm system selectively monitors the telephone activities for coded touch tone instructions specifically for the alarm system, and responds thereto by issuing synthesized voice reports on the status of the alarm system. A touch tone decoder circuit decodes dialed touch tones, such that the telephone can be utilized similar to a normal keyboard panel to access and control the alarm system. An internal power supply is provided for the telephone for supplying electrical power thereto independently of the outside telephone lines which normally supply power, in the event the outside telephone lines are inoperative. A ring detector circuit is provided for detecting the presence of a ring voltage across the outside telephone lines, and the microprocessor is responsive to a detected ring voltage to disconnect the telephone from the internal power supply and connect it to the outside telephone lines for normal ringing and usage of the telephone. The microprocessor counts the number of rings by which the telephone is being contacted by an off-premises telephone, and after a given number of rings, answers the telephone to allow the user of the off-premises telephone to dial touch tone encoded instructions into the integrated system and to receive voice synthesized reports therefrom.

8 Claims, 7 Drawing Sheets

INTEGRATED ALARM AND TOUCH TONE TELEPHONE SYSTEM

BACKGROUND OF THE INVENTION

1. Field of the Invention

The present invention relates generally to an integrated alarm and touch tone telephone system and, more particularly pertains to an integrated alarm system, typically incorporating both a fire and a burglar alarm, which can be accessed, programmed and reported upon through a touch tone telephone, either locally by an on-premises telephone or remotely by an off-premises telephone. The term Touch Tone is utilized herein to designate Dual Tone Multiple Frequency (DTMF) telephone dialing signals.

2. Discussion of the Prior Art

The type of alarm system per se described herein is typical of many prior art alarm systems incorporating a keyboard of some type which is operated to turn the alarm system, or particular zones thereof, on and off, and also to program operation of the alarm system in some manner. Moreover, the present invention was developed to be utilized in association with a typical prior art alarm system having some already existing features which are integrated into the operation of the subject invention. For instance, a typical prior art alarm system, upon detection of an alarm condition, seizes the local telephone system, terminating any calls presently in progress, and utilizes the telephone system to dial a monitoring station to report the alarm condition thereto. That seizure and reporting feature is advantageously taken advantage of by the present invention, which operates in association therewith in the control and utilization of the local telephone system. Additionally, a typical prior art alarm system sounds an alarm on the premises in the event of an alarm condition, and that feature of the alarm system per se is not altered by the present invention.

Moreover, telephones have often been integrated into alarm and other control systems to a limited extent. For example, Bachem et al. U.S. Pat. No. 4,095,050 discloses a system which controls and monitors remote irrigation equipment by a Touch Tone telephone. The system operates with a three digit access (ID) code and two digit control commands, and information on the irrigation equipment status (monitoring) is supplied to the caller by tone patterns transmitted over the telephone. Dick U.S. Pat. No. 4,121,053 discloses a somewhat similar telephone control system which incorporates a Touch Tone access code and control codes, and the system status is reported by changes in frequency of tones transmitted over the telephone. Fish et al. U.S. Pat. No. 4,122,305 illustrates a telephone Touch Tone control system for a remote dictating machine which allows a telephone user to call and use the remote dictating machine for dictation over the telephone connection while selectively operating the dictating machine by Touch Tone commands. Giovagnoni U.S. Pat. No. 4,130,732 discloses a burglar alarm system having a telephone Touch Tone alarm reset. Hilligoss, Jr. et al. U.S. Pat. No. 4,371,751 illustrates a system incorporating telephone reporting of a remote condition, such as a burglar or fire alarm, which automatically dials programmed telephone numbers and delivers voice synthesized reports on the status of the remote condition. Besen et al. U.S. Pat. No. 4,393,277 discloses a telephone Touch Tone control system for a tuner in which a speech synthesizer reports an acknowledgement of a received command. Hughes U.S. Pat. No. 4,489,438 discloses a Touch Tone telephone reporting system for credit cards, in which a synthesized voice instructs the caller to dial the credit card number on the Touch Tone receiver, and a synthesized voice then issues a report on the credit card. Durham U.S. Pat. No. 4,549,044 discloses a telephone reporting system having Touch Tone polling and reporting. Blanchard et al. U.S. Pat. No. 4,558,181 illustrates an alarm system incorporating synthesized voice reporting of an alarm condition, automated dialing of programmed numbers, and local reporting of the alarm condition, as by a loudspeaker.

However, none of the known prior art alarm and telephone systems has integrated those two systems to the extent disclosed and taught herein to allow an alarm system to be accessed, programmed, and reported upon through a Touch Tone telephone, either locally or remotely, and having protective features for the alarm system in the event the local telephone lines are inoperative for some reason, and further providing for integrated operation with a telephone answering machine while providing specific security measures therefor.

SUMMARY OF THE INVENTION

Accordingly, it is a primary object of the present invention to provide an integrated alarm and Touch Tone telephone system for a premises protected by the alarm system which allows the alarm system to be accessed, programmed, and reported upon through a Touch Tone telephone, either locally or remotely. Moreover, under most circumstances, the telephones on the premises can be operated in a normal manner, allowing outside calls coming in to be answered and responded to in a usual manner, and also allowing the telephones on the premises, including rotary dial telephones, to be used to place outside calls in a normal manner, without the integrated system interfering therewith. Additionally, the integrated system of the present invention is designed to be compatible with an on-premises telephone answering machine, and after a given number of rings, the telephone answering machine picks up and answers on the telephone lines in a normal manner. However, for security reasons, the telephone answering machine can be disconnected by the user by dialing a given Touch Tone encoded instruction into the system.

The integrated system of the present invention selectively monitors the telephone activities for coded Touch Tone instructions specifically for the alarm system, and will respond thereto by issuing synthesized voice reports on the status of the alarm system. In the event of an alarm condition, the alarm system seizes control of the outside telephone line, terminating any telephone calls in progress and not allowing any new telephone calls to be placed or received, and then utilizes the seized telephone line to report the alarm condition to one or more designated and programmed remote telephone numbers, reporting thereon by a digitally encoded report.

A further object of the subject invention is the provision of an integrated alarm and Touch Tone telephone system as described herein in which the operation of the alarm system on the premises is not adversely affected by an inoperative outside telephone line, as it incorporates an internal power supply for the on-premises telephones to allow Touch Tone dialing thereof for coded Touch Tone instructions to the alarm system, even when the outside telephone line is inoperative.

In accordance with the teachings herein, the present invention provides an integrated alarm and Touch Tone telephone system for a premises which allows the alarm system to be accessed through a Touch Tone telephone. The integrated system is coupled to the telephone lines, and is provided with a Touch Tone decoder circuit for decoding dialed Touch Tones, such that the telephone can be utilized similar to a normal keyboard panel to access and control the alarm system. The system is provided with an internal power supply for the telephone for supplying electrical power thereto independently of the outside telephone lines which normally supply power. This feature allows the Touch Tone telephone to be utilized to access and control the alarm system even when the outside telephone lines are inoperative. Moreover, a ring detector circuit is provided for detecting the presence of a ring voltage across the outside telephone lines, and the integrated system is responsive to a detected ring voltage to disconnect the telephone from the internal power supply and connect it to the outside telephone lines for normal ringing and usage of the telephone.

A speech synthesizer is provided for audibly reporting over the telephone on the condition of the alarm system. The audible reports can be issued to an on-premises telephone and also to an on-premises loudspeaker or to a remote telephone. The integrated system of the present invention is controlled by a microprocessor, and the processor is coupled to the ring detector circuit for counting the number of rings by which the telephone is being contacted by an off-premises telephone. The processor, after counting a given number of rings, answers the telephone by actuating a switch to allow the user of the off-premises telephone to dial Touch Tone encoded instructions into the integrated system and receive voice synthesized reports therefrom. Moreover, the voice synthesizer includes a PROM circuit which is selectively programmed to reflect the particular premises protected by the alarm system, such that the synthesized voice reports can be programmed to describe particular attributes of the premises in the audible reports.

The integrated system is also provided with an off-hook detecting circuit for detecting an off-hook condition of an on-premises telephone, which is indicated by a flow of current thereto, and the integrated system is responsive to a detected off-hook condition to disconnect the internal power supply from the telephone, and connect the telephone to the outside telephone lines. The system also checks the outside telephone line for an operative condition by monitoring the connection of the telephone to the outside telephone lines for continued current flow through the telephone, indicating an operative outside telephone line. The integrated system is responsive to an inoperative outside telephone line to disconnect the telephone from the outside telephone line and reconnect it to the internal power supply.

In greater detail, the processor controls a first relay operated set of switches for connecting an on-premises telephone to either the internal power supply or to the outside telephone lines, and a second relay operated set of switches for connecting a Touch Tone and synthesized speech transfer transformer across the telephone lines to allow Touch Tone input signals to be transferred from the telephone lines to be Touch Tone detection circuit, and synthesized speech reports to be transferred from the speech synthesizer to the telephone lines. The processor is coupled to the alarm system, the ring detector circuit, the Touch Tone decoder circuit, the off-hook and inoperative telephone lines detector circuit, and selectively activates the first and second solenoid operated switches in dependence upon the sensed input conditions.

Moreover, the present invention is preferably provided with a plurality of auxiliary relays for the selective operation of auxiliary systems, such as lighting, heating and air conditioning systems, to be operated by the integrated system in dependence upon the received Touch Tone encoded input instructions.

A significant feature of the present invention is the ability to test a remote station to test the operability and functionability of a remote alarm system by dialing proper Touch Tone encoded instructions over the telephone and observing the response of the alarm system thereto. For instance, alarm systems, incorporating the present invention will often be installed, either properly or improperly, by technicians not fully familiar with all features of the integrated system. If an installing technician observes problems or has questions with respect to the operabilitly and installation of the integrated system, he can contact skilled personnel of the manufacturing company who are thoroughly familiar with the operation and capabilities of the integrated system. Those skilled personnel can then perform a rather comprehensive remote testing and diagnosis of the installed system by dialing various Touch Tone encoded instructions to the installed system and observing the responses of the integrated system thereto.

BRIEF DESCRIPTION OF THE DRAWINGS

The foregoing objects and advantages of the present invention for an integrated alarm and Touch Tone telephone system may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
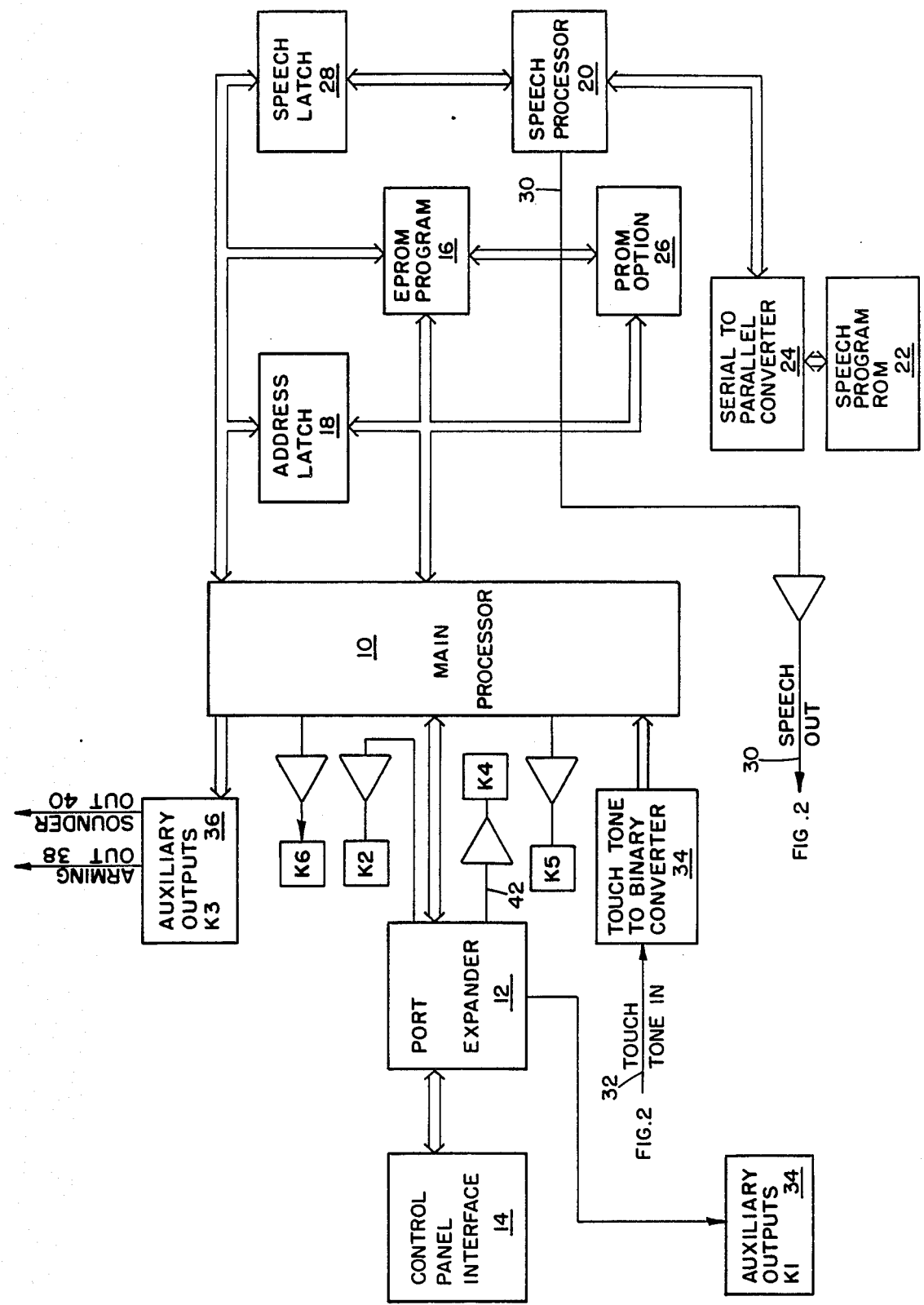
FIG. 1 is a simplified block diagram of the schematic circuit of FIGS. 3, 4 and 5 and illustrates the basic processor control system, with associated speech synthesizer circuits, a Touch Tone to binary converter circuit, and associated auxiliary outputs.
Figure 2:
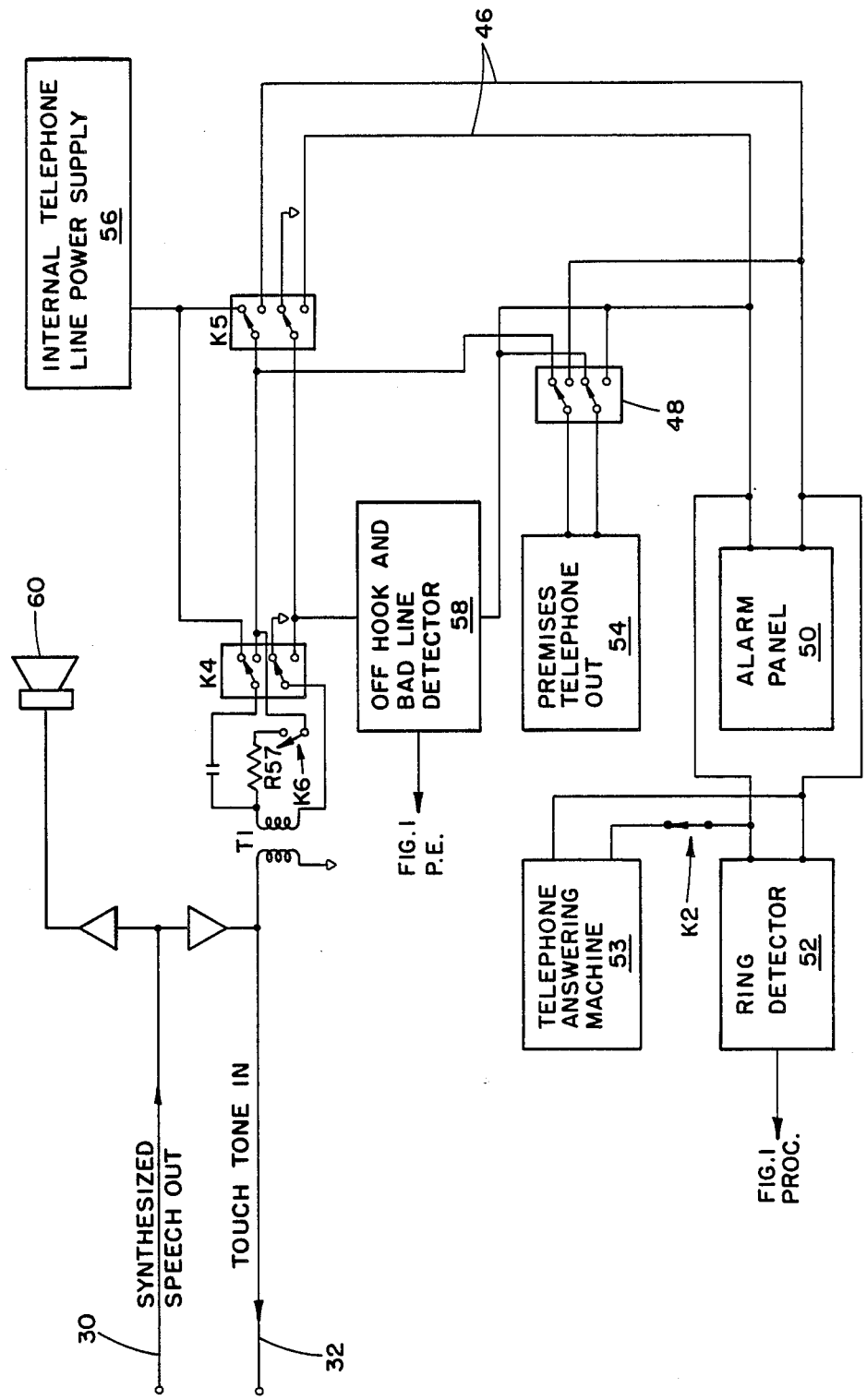
FIG. 2 is a simplified block diagram of the schematic circuit of FIGS. 6 and 7 and illustrates the basic interface of the telephone circuits with the integrated system, with FIGS. 1 and 2 forming a complete block diagram of the integrated system.
Figure 3:
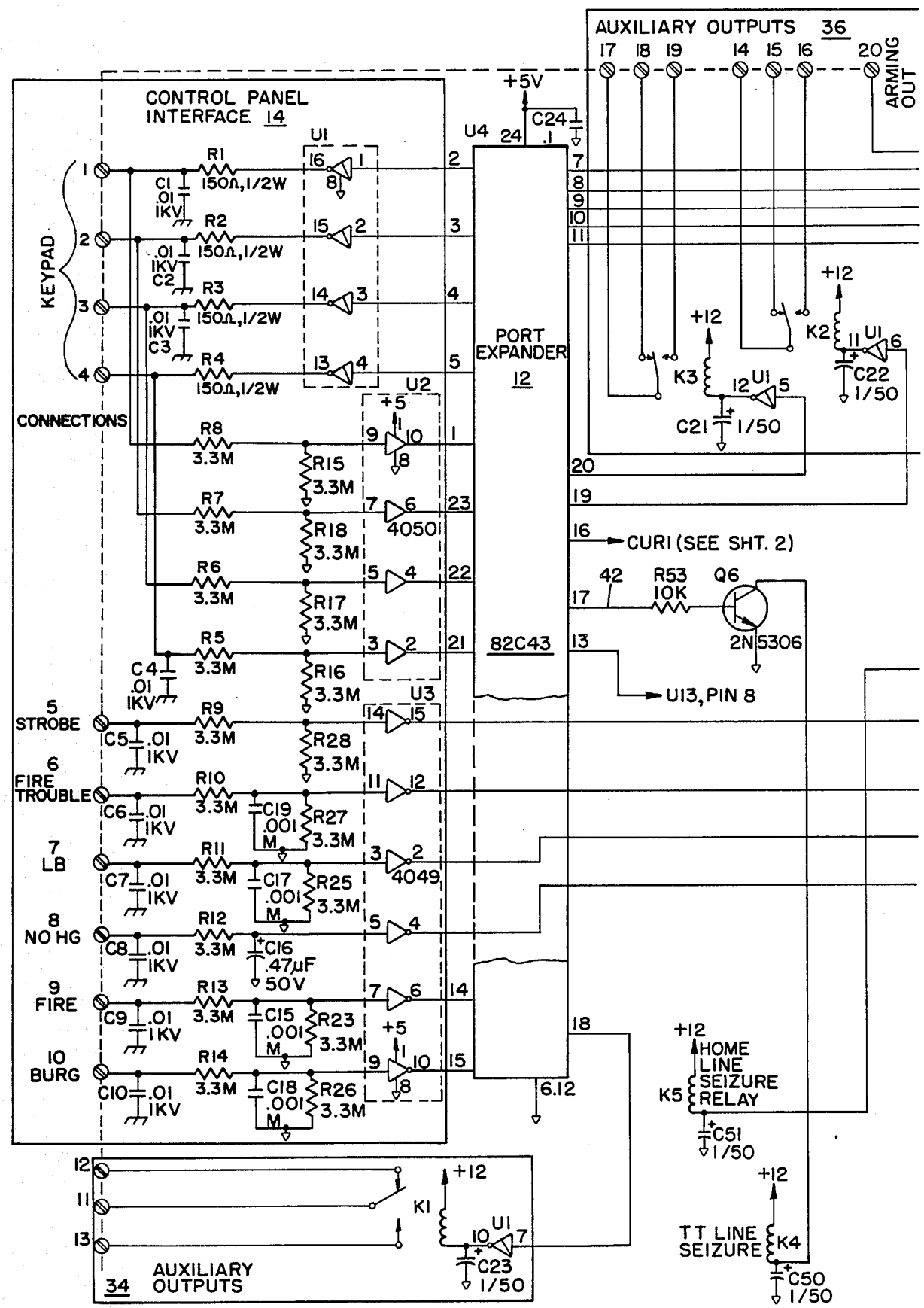
FIGS. 3, 4 and 5 when placed side by side with FIG. 3 on the left and FIG. 5 on the right illustrate a detailed schematic circuit of the basic processor control system, also referred to as SHEET 1 in the drawings, with associated speech synthesizer circuits, a Touch Tone to binary converter circuit, and associated auxiliary output circuits.
Figure 4:
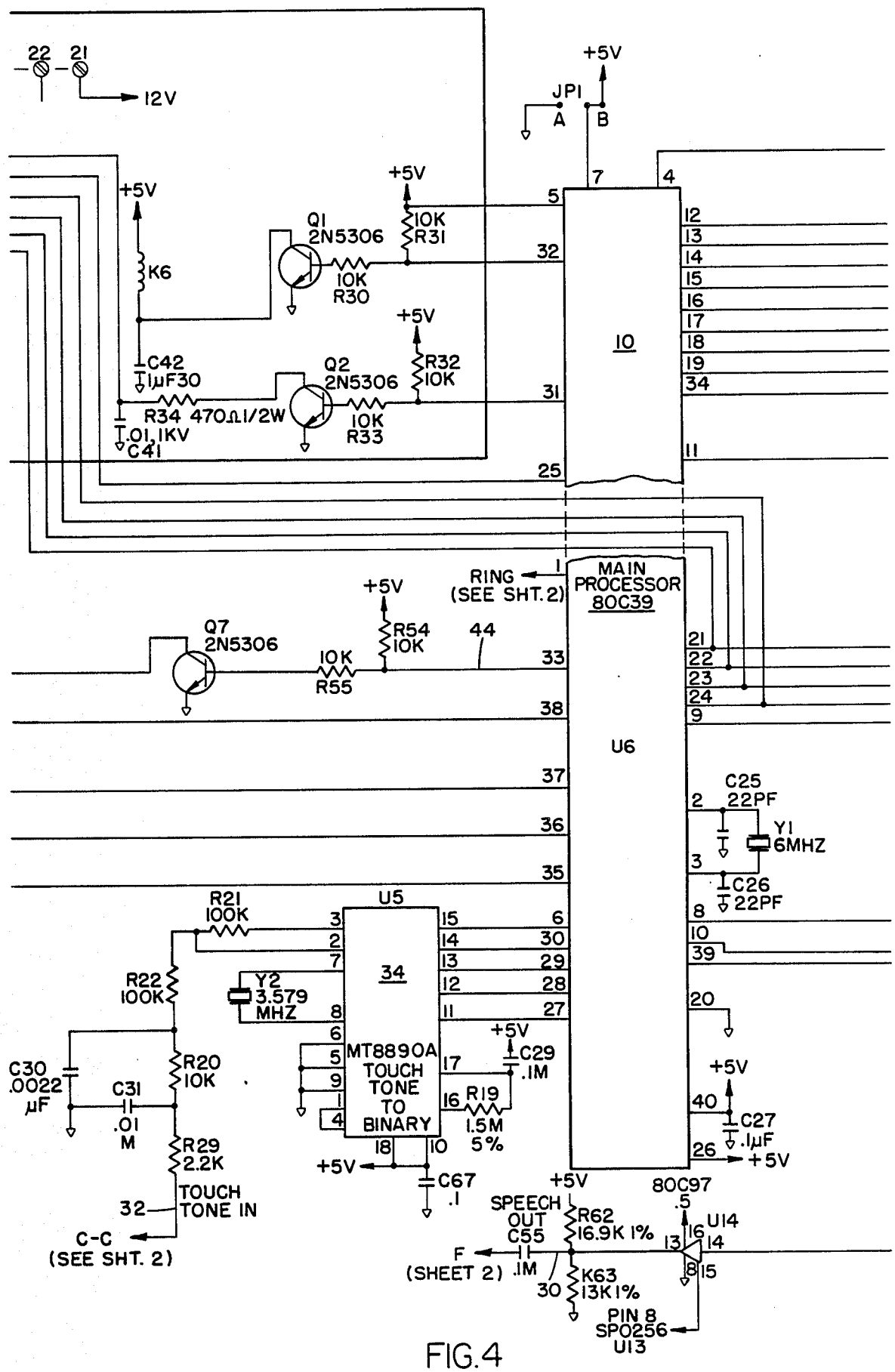
Figure 5:
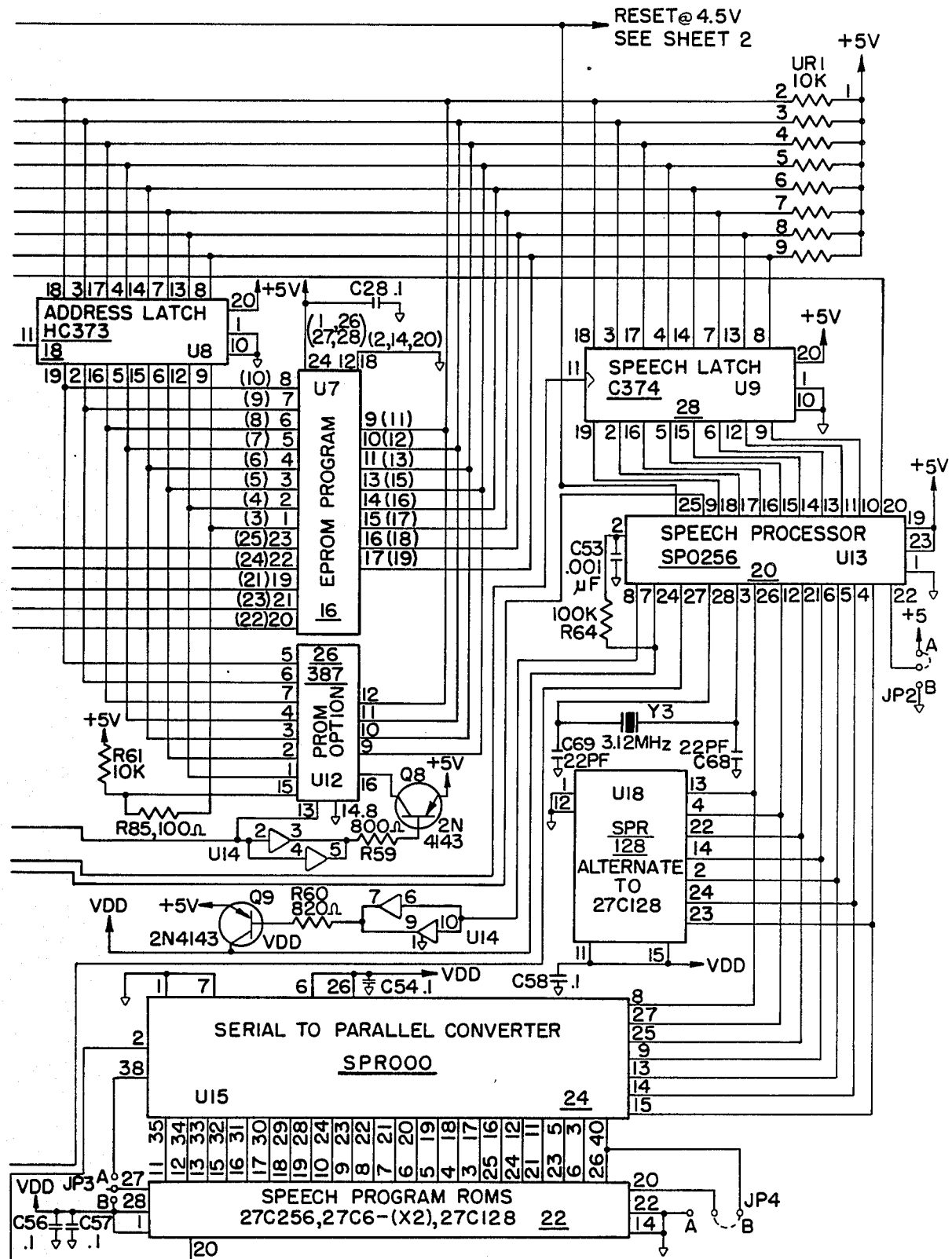
Figure 6:
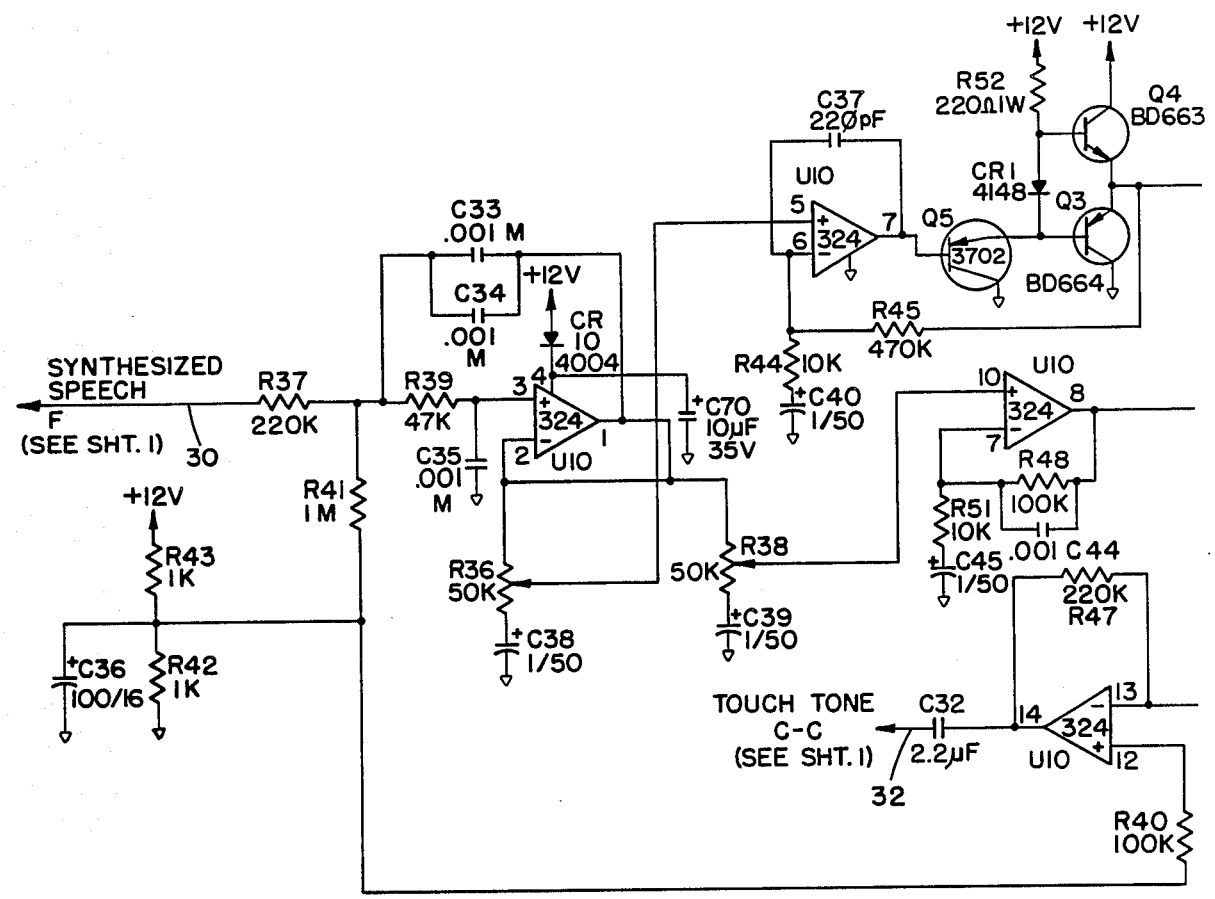
FIGS. 6 and 7 when placed side by side with FIG. 6 on the left illustrate a detailed schematic circuit of the internal telephones, outside telephone lines, and associated telephone circuits, also referred to as SHEET 2 in the drawings, with FIGS. 3, 4 and 5 (SHEET 1) and FIGS. 6 and 7 (SHEET 2) comprising a complete schematic of an exemplary embodiment of the present invention.
Figure 7:
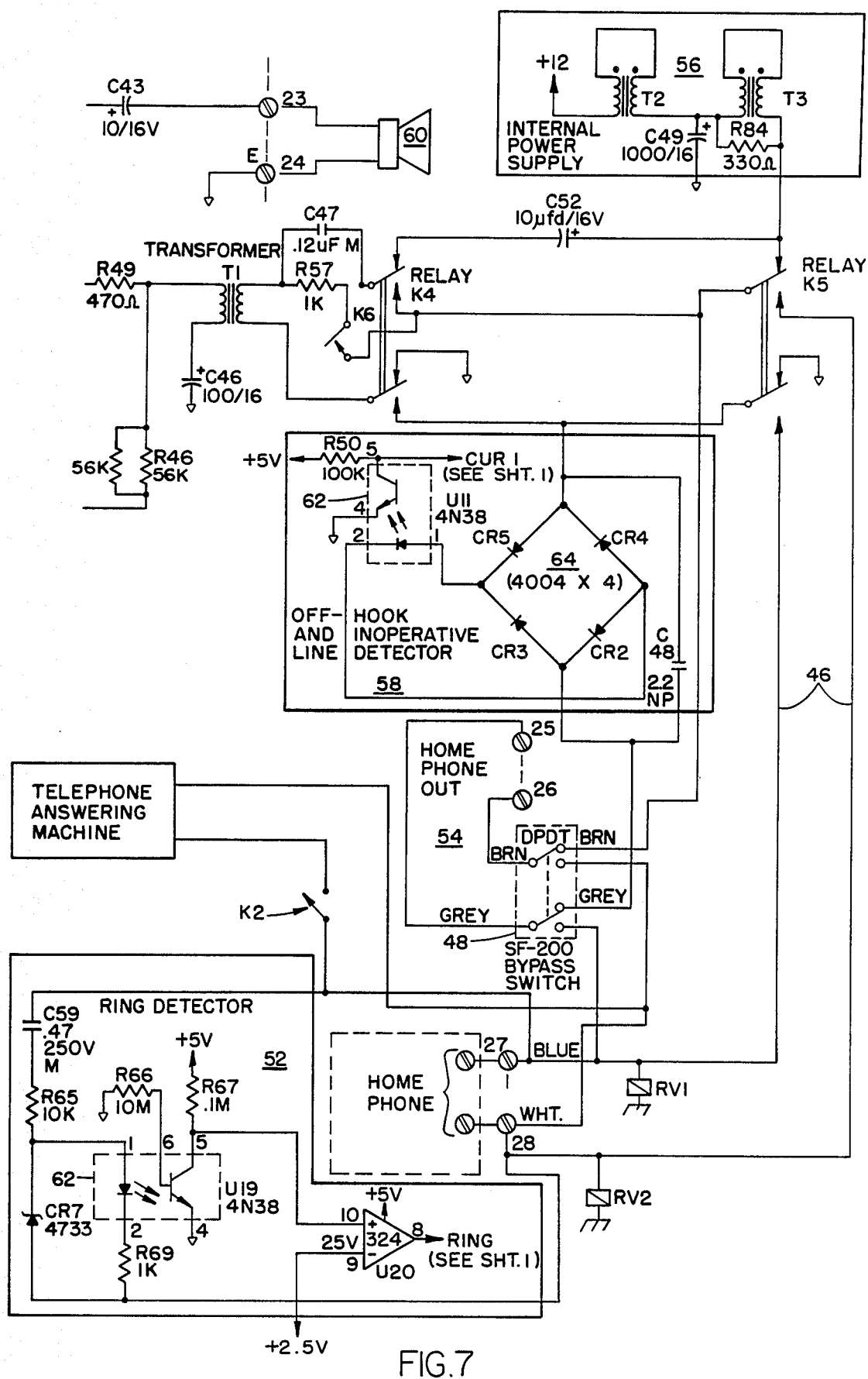

Referring to the drawings in detail, FIG. 1 illustrates a simplified block diagram of the schematic circuit of FIGS. 3, 4 and 5 and illustrates the basic processor control system, and FIG. 2 is a simplified block diagram of the schematic circuit of FIGS. 6 and 7, and illustrates the basic interface of the telephone circuits with the integrated system, with FIGS. 1 and 2 forming a complete block diagram of the total integrated system.

The integrated alarm and Touch Tone telephone system of the present invention is controlled and operated by a microprocessor 10 having an associated port expander 12. The port expander merely increases the number of input and output ports of the microprocessor 10, enabling a less expensive processor to be utilized, and for all intents and purposes can be considered functionally to be a part of the microprocessor.

The alarm system per se associated with the present invention is typical of prior art alarm systems, and includes a control panel interface 14 which is coupled through the port expander to the microprocessor. The control panel has a plurality of output terminals which indicate the status of the alarm system and the different zones of the premises monitored by the alarm system. The processor monitors the output terminals of the alarm system on a regular basis, e.g., many times a second, to determine on a regularly updated basis the status of the overall alarm system.

The processor 10 has associated therewith a program for running the processor, stored in an EPROM chip 16, and an address latch chip 18, all connected in a conventional manner.

Audible reports on the status of the alarm system are issued by a voice synthesizer comprising a separate speech processor chip 20. The speech processor 20 has a program associated therewith for instructing and running it, stored in a ROM chip 22, the serial output of which is converted to a parallel output by a serial to parallel converter chip 24. A PROM chip 26 is provided to allow a user of the integrated system to custom program the audible reports to the particular premises protected by the system. The processor also has a speech address latch chip 28 coupled thereto, and the connections of the chips 20, 22, 24, 26 and 28 are all relatively standard as is well known in the speech synthesizer arts. The audible speech output of the speech processor is on output lines 30, and is directed to the circuit of FIG. 2 as described in further detail hereinbelow.

The Touch Tone inputs from the touch tone telephones, which may or may not have Touch Tone encoded instructions for the integrated system, are received from the circuit of FIG. 2 on line 32, and are directed to a Touch Tone to binary converter chip 34, such that the processor 10 receives therefrom a binary output signal indicative of the Touch Tone received on line 32.

Depending upon the Touch Tone encoded input instructions received by the processor, it can operate two auxiliary relays K1 and K3, each of which operates and controls an auxiliary system, such as lights, heating, air conditioning, electric gates and doors, etc. Both of the outputs for relays K1 and K3 are controlled and operated by the processor 10 through the port expander 12. Conceptually, these are all the same, and as a practical matter they would be located together on one common panel.

The telephone interconnections and interfaces with the integrated system of the present invention are controlled by the processor 10, by relay K2 operated switch (disconnect answering machine switching means), by relay K4 operated switches (transformer T1 switching means), by relay K5 operated switches (internal power supply switching means), and by relay K6 operated switch (answer telephone switching means). Relays K2 and K4 are controlled and operated by the processor through the port expander 12.

FIG. 2 is a simplified block diagram of the interface of the telephone circuits with the integrated system. The outside telephone line(s) 46 are connected directly to a pair of switches operated by relay K5, a bypass switch 48, the alarm panel 50, a ring detector circuit 52, and a telephone answering machine 53.

The telephone system 54 of the premises can be connected directly to the outside telephone lines 46 when the switch 48 is in the opposite position to that illustrated in FIG. 2, effectively bypassing the integrated system of the present invention and allowing the on-premises telephones to operate in a completely conventional manner. In the position of the switch 48 illustrated in FIG. 2, the on-premises telephones are operated through the integrated system of the present invention.

An internal telephone line power supply 56 is provided by the present invention, primarily to provide a power supply for the Touch Tone telephones in the event the outside telephone lines 46 are inoperative or dead. In that event, the alarm system can still be accessed by the on-premises telephones by dialing the correct Touch Tone access code, the integrated alarm system can issue audible reports over the telephone lines, and the alarm system can be controlled and reprogrammed by dialing the correct Touch Tone encoded instructions.

FIG. 2 illustrates the relays K4 and K5 in their normally inactivated states during quiescent periods of the telephones and the alarm system. In the illustrated and inactivated position of relay K5, the internal power supply is directed through the switches of relay K5 to the on-premises telephones, which are not connected to the outside telephone lines. In the activated position of relay K5, the internal power supply 56 is disconnected through the switches associated with relay K5, and the connections to the outside telephone lines 46 are transferred by the switches associated with relay K5 to the two lines to the left thereof.

The transformer T1 is a Touch Tone and synthesized speech transfer transformer, and in the activated, nonillustrated position of relay K4, allows Touch Tone signals to be transferred from the telephone system through transformer T1 to the left to line 32 to the Touch Tone to binary converter circuit 34 of FIG. 1. The activated position of relay K4 also allows synthesized voice reports on line 30 to be transferred through transformer T1 to the right in FIG. 2 to the telephone lines. Moreover, when both relays K4 and K5 are inactivated, both relays K4 and K5 establish connections to allow Touch Tone signals and synthesized voice reports to be transferred through transformer T1, as described in greater detail hereinbelow.

In summary, the present invention utilizes both a first relay K5 and a second relay K4 to interconnect the alarm system and the telephone system, which includes the in-house telephone(s) and the outside telephone lines. Both relays are normally maintained in inactivated states during quiescent periods of the alarm and telephone systems. In its normally inactivated position, the first relay K5 connects an internal power supply across the on-premises telephones to allow Touch Tone dialing thereon, such that an on-premises telephone can be used to dial Touch Tone coded instructions to the alarm system in the event the outside telephone lines are inoperative or dead. The first relay K5 is activated to connect the on-premises telephones across the outside telephone lines, and is activated under control of the microprocessor, as explained in greater detail hereinbelow.

The second relay K4 is also normally inactivated, and both relays K4 and K5 are activated together to allow the integrated system to monitor the telephone system for Touch Tone encoded instructions, and also to transmit voice synthesized reports over the telephone.

In the present design of the circuits illustrated herein, relays K4 and K5 are always activated or deactivated together, and accordingly, all of the switches operated thereby could be operated by a single relay, thereby using one less port of the processor. The original design with both relays K4 and K5 was generated prior to designing the integrated system for operation with a telephone answering machine. For that option, relays K2 and K6 were added as shown, and relay K6 is activated to answer the telephone by placing the resistor R57 across the telephone lines after a number of rings (e.g., 10 or 12) if no answering machine is present to previously pick up after a lesser number of rings (e.g., 5). The switch associated with relay K6 is normally open in the inactivated position of relay K6, and is closed upon actuation thereof to answer the telephone by placing resistor R57 across the telephone lines. The switch associated with relay K2 is normally closed as shown in FIG. 2 in its inactivated state, to maintain the answering machine on-line, and is deactivated for security reasons to take the answering machine off-line, as explained in greater detail hereinbelow.

An off-hook and bad outside telephone line detector circuit 58 is provided to alert the microprocessor to activity on an on-premises telephone to selectively activate the first and second relays in accordance with the detected activity. Picking up the receiver of an on-premises telephone effectively places a resistance across the terminals of 54. The internal telephone power supply 56 is connected through the top switch of the inactivated relay K5 to the top terminal of 48, causing current to flow therethrough, through the off-hook detector circuit 58, through the bottom switch of the inactivated relay K5 to ground, which activates an opto-isolation circuit in detector 58, which signals to the microprocessor that an on-premises telephone has been placed off-hook. The microprocessor then activates the first and second relays, such that the first and second relays K4 and K5 are always activated in response to an on-premises telephone being picked up. Activation of the first relay K5 connects the on-premises telephone to the outside telephone lines, while the simultaneous activation of the second relay K4 connects the Touch Tone and speech transfer transformer T1 to both the on-premises telephones and the outside telephone lines. The Touch Tone decoding circuit of the alarm system then monitors the Touch Tone dialing activity through the transformer T1.

Moreover, after the first relay K5 connects the on-premises telephones to the outside telephone lines, the off-hook and bad outside telephone line detector circuit is monitored by the processor for continued current flow, which should now be provided by the voltage across the outside telephone lines. A lack of continued current flow indicates inoperative or dead outside telephone lines, and the processor then deactivates both relays K4 and K5, with the deactivated relay K5 disconnecting the on-premises telephone from the outside telephone lines and reconnecting it to the internal telephone lines power supply, thus allowing continued Touch Tone dialing of encoded instructions.

With the relays K4 and K5 both deactivated as shown in FIG. 2, the internal power supply connects through the top switch of K5 to the top line of the premises telephone 54, while the bottom line of the premises telephone 54 connects through the detector circuit 58 and bottom switch of relay K5 to ground. Likewise, the top line of the premises telephone 54 connects through the top switch of relay K5 and the top switch of relay K4 to transformer T1 through the bottom switch of relay K4 to ground, and the bottom line of the premises telephone 54 connects through the detector circuit 58 and the bottom switch of K5 to ground, thus completing the circuit and allowing Touch Tone dialing of encoded instructions to pass through transformer T1 to be decoded and acted upon. The Touch Tone signals are then decoded and converted to a binary instruction by the decoding circuit 34. The microprocessor receives the converted binary signal, and if it is the correct Touch Tone access signal, the microprocessor, which is constantly monitoring the status of the alarm system in a normal fashion, reports on the present status of the alarm system through the voice synthesizer circuits.

Assuming that the outside telephone lines are functioning properly, both relays K4 and K5 remain activated, and the Touch Tone dialing activity and synthesized speech can pass through the transformer T1, with Touch Tone activity passing from right to left through the transformer T1 to the Touch Tone decoding circuit 34, and synthesized voice reports passing from left to right through the transformer T1 to the on-premises telephones and outside telephone lines. The synthesized voice reports are delivered both to the particular telephone which instituted the Touch Tone encoded request and to a local loudspeaker 60, although the loudspeaker, if desired, could be disconnected by a separate switch therefor.

Assume that an on-premises telephone has been picked up, that the relays K4 and K5 are activated, and that the in-house operator places a normal telephone call. The Touch Tone detection circuit detects the dialing of only normal numerical Touch Tone, not non-numerical access (ID) Touch Tones (e.g. # or *), and accordingly the processor does not respond thereto, but maintains both relays K4 and K5 activated, and the processor continues to monitor for Touch Tone encoded instructions through the transformer T1. The relays K4 and K5 remain activated to maintain the on-premises telephones connected across the outside telephone lines, until the off-hook detector circuit 58 detects that the telephone has been hung up, after which relays K4 and K5 are inactivated to place the system back in its normal quiescent state.

Assume that an on-premises telephone has been picked up, that the relays K4 and K5 are activated, and that the in-house operator desires to use the Touch Tone telephone as a keypad to access the alarm system. The operator must dial the proper access code, which is preferably formed by nonnumerical Touch Tone (i.e., # or *), such as ** to alert the microprocessor immediately to the alarm system function.

The Touch Tone signals are decoded and converted to a binary instruction by the decoding circuit 34. The microprocessor receives the converted binary signal, and if it is the correct Touch Tone access signal, the microprocessor, which is constantly monitoring the status of the alarm system in a normal fashion, reports on the present status of the alarm system through the voice synthesizer circuits. One advantageous feature of the present system is a limited program library of words which can be programmed together in PROM 26 to form sentences reporting on the status of the particular premises served by the system (e.g., THE FACTORY WINDOW IS IN TROUBLE AND MUST BE CHECKED).

After reporting on the status of the alarm system, the system can be reprogrammed by additional Touch Tone commands, for instance to inactivate or activate a particular zone of the alarm system, and the system then generates an updated status report therough the voice synthesizer. The reprogramming of the alarm system preferably requires the dialing of a security access code, which may be a Touch Tone numerical code such as 35246. The dialing of the security access code is then followed by the dialing of programmed instructions.

The two associated relays K1 and K3 can also be activated or deactivated through appropriate Touch Tone commands to activate or deactivate an auxiliary system associated with each relay, for instance a heating system, air conditioning system, lights, doors, electric gates, etc.

Moreover, the integrated system of the present invention is designed to be compatible with rotary dial telephones, allowing them to be utilized in a normal manner to place or receive telephone calls. The presence of R57 in series with a rotary telephone would effectively prevent dialing therefrom. However, relay K6 is utilized to bypass R57, such that the inactivated position of relay K6 illustrated in FIG. 2 allows rotary dialing from an on-premises telephone. Such rotary telephones could not dial Touch Tone encoded instructions, but could be utilized as normal telephones on the premises and could dial outside calls.

The ring detector circuit 52 is provided to detect an incoming telephone call, and is basically a current detector circuit employing an opto-isolator circuit, which produces a +5 V output signal to the processor to signal the presence of an outside telephone call. In response to the initial detection of a ringing voltage, the processor activates relays K4 and K5, and relay K5 connects the outside telephone lines to the on-premises telephones, thereby allowing the ringing voltage on the outside telephone lines to activate the ringing circuits of the on-premises telephones.

If an on-premises telephone is then picked up and answered in a normal manner, the processor detects the pick-up through the off-hook detector circuit 58, and relays K4 and K5 remain activated until the on-premises telephone is hung-up, again detected by the off-hook detector circuit 58, after which relays K4 and K5 are deactivated and the system returns to a quiescent state. When the on-premises telephone is picked up and answered in a normal manner, the microprocessor maintains relays K4 and K5 in activated states, such that Touch Tone encoded instructions and synthesized voice reports can be transferred by the transformer T1 in response to dialing at any time of the proper Touch Tone access code.

Assume that the on-premises telephone is not immediately picked up, and that an answering machine 53 is present and operable to answer on the telephone line in a normal operating fashion after a given number of rings (e.g., five or six). Relays K4 and K5 have already been activated at the first detected ring voltage as described hereinabove. The caller can then listen to the answering machine and leave a message as in normal operation thereof, and can then hang up. The answering maching then hangs up in a normal manner, which is detected by the off-hook detector circuit, and the microprocessor responds thereto by inactivating relays K4 and K5, and the system then returns to a normal quiescent state.

Alternatively, assume that the caller who is answered by the answering machine desires a status report on the alarm system or desires to reprogram the alarm system. Since relays K4 and K5 are activated while the machine is on the line, the caller can simply dial the correct Touch Tone encoded instructions over the telephone, which will then be decoded and responded to in a manner as indicated hereinabove. However, with the answering machine also being on-line, any Touch Tone encoded instructions dialed over the telephone might be recorded, which could represent a breach of security. Accordingly, the further relays K2 and K6 are provided for operation under these circumstances. The user must first dial a proper Touch Tone encoded instruction, e.g., *, responsive to which the microprocessor initially activates relay K6 to place resistor R57 across the telephone lines to prevent the call from being disconnected when a short time later, e.g., 10 milliseconds, the microprocessor activates relay K2 to open its associated switch and disconnect the answering machine from the line. The user can then dial the proper Touch Tone instructions to receive an alarm system status report, or reprogram the alarm system thereafter, without danger of the answering machine recording the Touch Tone dialed instructions and the resultant reports. The system, after issuing any synthesized voice report, then times a given time interval, e.g., twenty seconds, for any additional Touch Tone instructions to be received, and if no additional Touch Tone encoded instructions are received within that given time interval, the system disconnects the telephone connection by inactivating relay K6. The system then returns to its normal quiescent state.

Assume that the on-premises telephone is not answered, and that an answering machine is either not present or disconnected and that the number of rings detected by the ring detector circuit and counted by the microprocessor exceeds a programmed number of rings (e.g., ten or twelve), the microprocessor then activates relay K6, which places resistor R57 across the outside telephone lines and in effect answers the telephone. The processor, operating as before had activated relays K4 and K5 in response to the initial ring voltage, such that the tone detection circuit of the system is now monitoring through transformer T1 the outside telephone lines for an encoded Touch Tone signal, and if the proper Touch Tone encoded signal is received thereon, such as **, the alarm system responds by delivering a synthesized voice message over the outside telephone lines on the status of the alarm system. This mode then proceeds in the same manner as if the alarm system were being operated as described hereinabove.

The above operations describe the normal functions of the alarm system and on-premises and off-premises telephones during reporting and programming in the absence of an alarm condition. In the event of an alarm condition, the integrated system utilizes the telephone system to report on the alarm condition. Assume first that the on-premises telephones are not being utilized diring the occurence of an alarm condition. The present invention was developed to be utilized in association with a typical prior art alarm system having already existing features which are integrated into the operation of the subject invention. For instance, a typical prior art alarm system, upon detection of an alarm condition, seizes the local telephone system, terminating any calls presently in progress, and utilizes the telephone system to dial a monitoring station to report the alarm condition thereto. That seizure and reporting feature remains the same. However, the integrated system can still be accessed and controlled through an on-premises telephone. After pick-up thereof, the detector circuit 50 signals the microprocessor that an on-premises telephone has been placed off-hook. The microprocessor then activates the first and second relays. Activation of the first relay K5 connects the on-premises telephone to the outside telephone lines, while activation of the second relay K4 connects the Touch Tone and speech transfer transformer T1 to both the on-premises telephones and the outside telephone lines. After the first relay K5 connects the on-premises telephones to the outside telephone lines, the off-hook and bad outside telephone line detector circuit is monitored by the processor for continued current flow, which is not now provided by the outside telephone lines because they have been seized by the alarm system. A lack of continued current flow indicates inoperative telephone lines, and the processor then deactivates both relays K4 and K5, with relay K5 disconnecting the on-premises telephone from the outside telephone lines and reconnecting it to the internal telephone lines power supply, thus allowing Touch Tone dialing of encoded instructions. As explained hereinabove, the inactivated positions of the first relay K5 and the second relay K4 still allow the Touch Tone dialing activity to pass through the transformer T1 to the converter 34 and the processor, and thus the alarm system can now be controlled and reprogrammed from the on-premises telephone, for instance to inactivate the alarm system.

Assume next that the on-premises telephone is being utilized in a normal telephone call when an alarm condition occurs. In this situation, relays K4 and K5 are initially activated, and in the event of an alarm condition, the alarm system seizes the outside telephone lines as before, disconnecting any telephone calls then in progress, and not allowing any additional telephone calls to be placed or received. The seized outside telephone lines leaves lines 46 inoperative or dead, which is detected by a lack of current flow by detection circuit 58 and signalled to the processor. The microprocessor then deactivates both relays K4 and K5, with relay K5 disconnecting the on-premises telephone from the outside telephone lines, and connecting the internal power supply 56 to the on-premises telephones, which can then be utilized to control and reprogram the alarm system as in the previous example.

The alarm system per se also sounds a local alarm on the premises to alert on-premises personnel to the presence of the alarm condition.

FIGS. 3, 4 and 5, and FIGS. 6 and 7 are respectively complete and detailed schematic circuits of the block diagrams of FIGS. 1 and 2, giving detailed circuit connections and components, and also the detailed pin and port connections. The opto-isolation detector circuits 62 in the detector circuits 52 and 58 are illustrated in greater detail. The diode bridge circuit 64 of the detector circuit 58 allows current detection in either direction, either from the internal power supply 56 or the external telephone lines 56. In FIG. 5, the chip U18 is indicated as being a hardware alternative to 27C128 in the speech program ROMS 22, as is well known in the speech synthesis arts.

With the operation of the circuits having been explained, the programming for the main processor is a relatively straightforward task requiring only ordinary skill in the programming arts.

One exemplary embodiment of a Touch Tone programming system as developed for a commercial product embodying the present invention is described hereinbelow merely as an exemplary embodiment.

From an on-premises telephone, to check the status of the security system, lift the receiver and press * twice: (*,*). The security system responds with a complete status report as to whether it is on or off, if any doors or windows are open, if there is a problem in the system, etc. A status report is issued automatically each time the system is armed, disarmed, or reprogrammed.

To arm the security system, check status (*,*) to make sure that all protected openings are secured. The system cannot be armed with an open loop (open window, etc.) STATUS MESSAGE: THE SECURITY SYSTEM IS OFF, BACK DOOR IS IN TROUBLE AND MUST BE CHECKED. Accordingly, the back door must be closed before arming is possible. Once all protected openings are secured, check status (*,*) again. STATUS MESSAGE: THE SECURITY SYSTEM IS OFF. The security system can now be armed. Press * and the 5 digits of the security access code, and listen for the confirmation message: THE SECURITY SYSTEM IS ON. ALL SYSTEM DELAYS ARE ON. The operator then has a preset period of time (exit delay time) to leave the premises through a door designated by the installer as a delay zone.

If the operator is within the premises, and no one is expected to return while the system is armed, the time delay coor can be programmed to report an alarm instantly. This is accomplished by selecting the INSTANT option. To select the INSTANT option, first arm the system as described hereinabove: THE SECURITY SYSTEM IS ON. ALL SYSTEM DELAYS ARE ON. Now press # twice (#,#), and press status (*,*) for confirmation: ALL SYSTEM DELAYS ARE OFF.

To disarm the security system; press * and the five digits of the security access code, and listen for confirmation: THE SECURITY SYSTEM IS OFF. A complete system status report will be issued automatically each time the system is disarmed.

A zone refers to all of the devices that are connected to one circuit in the alarm control panel. For example, if all of the master bedroom windows and doors are wired to one circuit, the master bedroom would be considered a zone. If on the other hand, all of the windows and doors of all of the upstairs rooms are wired to one circuit, then upstairs would be considered a zone. In the present invention, zone descriptions can be custom-programmed for an individual security system by the alarm company. These may be actual descriptions, such as "BACK DOOR", "MASTER BEDROOM", "FACTORY ENTRANCE", etc., or may indicate a zone number, such as, "ZONE 3".

If it is desired to arm only a part of the system, such as the front doors and windows, but still have the freedom to come and go, for instance, through the back door, the desired zone(s) can be bypassed and the rest of the system armed. To bypass one or more zones, make sure that the system is disarmed: THE SECURITY SYSTEM IS OFF. Then press # then * (#,*). Press the number of the zone to be bypassed. Example: To bypass zone 3, press #, then * then 3. Then check the status (*,*): THE BACK DOOR IS BYPASSED. To bypass additional zones, repeat the three steps above. Now arm the system by pressing * and the 5-digit security code. To maintain the security of the system, a bypass message will not be issued after the system has been armed.

To unbypass a single zone, make sure that the security system is disarmed, then press #, then *, and press the number of the zone to be unbypassed. Alternatively, to unbypass all bypassed zones; the system must be disarmed. Then press #, then 0 (Reset).

The integrated system of the present invention includes auxiliary relay functions to enable an operator to turn on and off up to two additional functions on your premises, such as air conditioner, lights, jacuzzi, etc. The auxiliary relay function turns the designated function on if it is off, or off if it is on. These functions will be reported in the system status report, and each time the system is armed or disarmed. To operate the auxiliary relay function: press # and the Relay Number. Then check status (*,*): RELAY 1 IS ON (OFF).

The present invention can also incorporate an override function to prevent the security system from being operated via on-premises telephones. This may be elected, for instance, to avoid unauthorized tampering by curious guests. The convenience switch is operated to bypass the on-premises telephones, which does not cut off the external access function.

The integrated system of the present invention reports and responds clearly with synthesized Englishh language messages concerning the status of the system. The English language messages are programmed (hand tailored) into a PROM as per programming directions. The main body of programming includes the English language words that will be reported when any of the zones of the control panel are reported on. In other words, the zones of the control panel are named or hand tailored to the particular security system. For example zone 1=front door, zone 2=kitchen, and zone 3=basement. Furthermore, the two auxiliary relays can also be named. For example: relay 1=air conditioner, and relay 3=front yard lights.

The following is an exemplary limited library of programmable words which can be combined to issue status reports on the alarm system.

| PROGRAMMABLE LIBRARY | | | | | |
|---|---|---|---|---|---|
| 00 | A | 27 | FLOW | 4C | PRESSURE |
| 01 | AC | 28 | FOUR | 4D | PROGRAM |
| 02 | AIR CONDITIONER | 29 | FREEZER | 4E | PROTECTED |
| | | 2A | FRONT | | |
| 03 | ALARM | | | | |
| 04 | ALL | | | | |

-continued

| PROGRAMMABLE LIBRARY | | | | | |
|---|---|---|---|---|---|
| 05 | AND | | | 4F | READY |
| 06 | ARE | 2B | GARBAGE | 50 | RECEIVING |
| 07 | AREA | 2C | GUEST | 51 | RELAY |
| 08 | ATTIC | | | 52 | RESET |
| | | | | 53 | RIGHT |
| | | 2D | HALL | | |
| | | 2E | HAVE | 55 | ROOM |
| | | 2F | HIGH | | |
| 09 | BACK | | | | |
| 0A | BASEMENT | | | 56 | SAFE |
| 0B | BATH | 30 | IMMEDIATELY | 57 | SECURITY |
| 0C | BATTERY | | | 58 | SERVICE |
| 0D | BE | 31 | IN | 59 | SEVEN |
| 0E | BEDROOM | 32 | INSTANT | | |
| 0F | BOILER | 33 | INTERIOR | 5B | SIDE |
| 10 | BURGLAR | 34 | IS | 5C | SIX |
| 11 | BYPASSED | | | 5D | SKYLIGHT |
| | | 35 | KITCHEN | 5E | SLIDING |
| | | | | 5F | SMOKE |
| | | | | 60 | SOUND 12 CALL |
| | | 36 | LAUNDRY | | |
| 13 | CENTRAL | 37 | LEAVE | 61 | SOUTH |
| 14 | CHECKED | 38 | LEFT | 62 | SSSSS |
| 15 | CLOSET | 39 | LIGHTS | 63 | STAIRS |
| 16 | COMPUTER | 3A | LIVING | 64 | STOCK |
| | | 3B | LOW | 65 | SYSTEM |
| 17 | DDD | | | 66 | TEMPERATURE |
| 18 | DELAYS | 3C | MASTER | | |
| 19 | DEN | 3D | MEDICAL | 67 | THE |
| 1A | DETECTOR | 3E | MUST | 68 | THREE |
| 1B | DINING | 69 | TROUBLE | | |
| 1C | DOOR | | | 6A | TWO |
| 1D | DOWN | 3F | NINE | | |
| | | 40 | NORTH | 6B | UP |
| 1E | EAST | 41 | NOT | | |
| 1F | EIGHT | | | 6C | VIOLATED |
| 20 | ENTRANCE | 43 | OFF | | |
| 21 | EXIT | 44 | OFFICE | 6D | WALL |
| | | 45 | ON | 6E | WAS |
| | | 46 | ONE | 6F | WATER |
| | | 47 | OUT | 70 | WERE |
| 22 | FACTORY | 71 | WEST | | |
| 23 | FAN | 48 | PANIC | 72 | WINDOW |
| 24 | FIRE | 49 | PERIMETER | | |
| 25 | FIVE | 4A | POLICE | 73 | YOU |
| 26 | FLOOR | 4B | PRESS | | |
| | | | | 74 | ZERO |

NOTE:
DDD is to indicate past tense of a word.
SSSS to pluralize a word.

The following is an exemplary limited library of dedicated reports which can be issued by synthesized voice reports generated by the present invention.

DEDICATED LIBRARY

"IS IN ALARM"
"IS IN TROUBLE AND MUST BE CHECKED"
"IS NOT RESET. PRESS RESET"
"IS BYPASSED"
"THE SECURITY COMPUTER IS READY FOR PROGRAM"
"THE SECURITY COMPUTER PROGRAM IS OFF"
"THE SECURITY SYSTEM IS ON"
"THE SECURITY SYSTEM IS OFF"
"THE SECURITY SYSTEM IS IN TROUBLE. CALL FOR SERVICE"
"THE CENTRAL WAS CALLED"
"THE CENTRAL WAS NOT CALLED. PRESS RESET"
"ALL SYSTEM DELAYS ARE ON"
"ALL SYSTEM DELAYS ARE OFF"

"THE AC IS IN TROUBLE AND MUST BE CHECKED"
"THE BATTERY IS IN TROUBLE. CALL FOR SERVICE"
"THE FIRE ZONE IS IN TROUBLE. CALL FOR SERVICE"
"YOU HAVE PRESSED PANIC"
"YOU HAVE PRESSED MEDICAL"
"THE FIRE SOUND IS ON"
"IS ON"
"IS OFF"

While several embodiments and variations of the present invention for an integrated alarm and Touch Tone telephone system are described in detail herein, it should be apparent that the disclosure and teachings of the present invention will suggest many alternative designs to those skilled in the art. For instance, the relay operated switches associated with relays K4 and K5 could be replaced by solid state switches or by a single relay operated set of switches. The detector circuits 52 and 58 could be implemented with alternative circuit designs. The port expander could be eliminated by utilizing a more expensive processor with more ports. The number of auxiliary outputs could be increased or decreased. The exemplary coding for the exemplary commercial embodiment could be modified in many different respects.

What is claimed is:

1. An integrated security and Touch Tone telephone system for a premises which allows the security system to be accessed through a Touch Tone telephone comprising:
   a. an on-premises Touch Tone telephone for the premises for connection by on-premises telephone lines to outside telephone lines during normal usage of the on-premises Touch Tone telephone, with the integrated security and Touch Tone telephone system being coupled by on-premises telephone lines to the on-premises Touch Tone telephone, and to the outside telephone lines;
   b. a security system for detecting an alarm condition at the premises, such as an unauthorized intrusion or a fire, with the integrated security and Touch Tone telephone system being coupled to said security system for monitoring the status thereof;
   c. a speech synthesizer for audibly reporting over the on-premises Touch Tone telephone or over the outside telephone lines on the condition of the security system;
   d. a Touch Tone decoder means, coupled by on-premises telephone lines to the on-premises Touch Tone telephone, and to the outside telephone lines, for decoding telephone Touch Tones which are received thereby, to allow a Touch Tone telephone, either the on-premises Touch Tone telephone or other Touch Tone telephones coupled over the outside telephone lines, to be utilized to access and control the security system;
   e. a ring detector means for detecting the presence of a ring signal across the outside telephone lines;
   f. an off-hook detecting means for detecting an off-hook condition of the on-premises telephone which is indicated by a flow of current to the on-premises telephone;
   g. an internal power supply for the on-premises telephone for supplying electrical power thereto independently of the outside telephone lines;
   h. an internal power supply switching means for connecting the on-premises telephone to either the internal power supply or to the outside telephone lines;
   i. a control means for the integrated security and Touch Tone telephone system, said control means controlling said internal power supply switching means to couple the on-premises Touch Tone telephone to the internal power supply during the periods of nonusage of the on-premises Touch Tone telephone, and being responsive to said ring detector means and said off-hook detecting means to control said internal power supply switching means to connect the on-premises Touch Tone telephone to the outside telephone lines in response to said ring detector means detecting the presence of a ring signal across the outside telephone lines, and also in response to said off-hook detecting means detecting an off-hook condition of the on-premises telephone, said control means further including means for detecting inoperative outside telephone lines, said means for detecting inoperative outside telephone lines utilizing said off-hook detecting means for monitoring the connection of the on-premises telephone to the outside telephone lines for continued current flow through the on-premises telephone after connection to the outside telephone lines, indicating operative outside telephone lines, with the lack of continued current flow indicating inoperative outside telephone lines, and the integrated system being responsive to inoperative outside telephone lines to disconnect the on-premises telephone from the outside telephone lines and reconnect it to the internal power supply.

2. An integrated security and Touch Tone telephone system for a premises which allows the security system to be accessed through a Touch Tone telephone, as claimed in claim 20, further including a telephone answering machine coupled to said outside telephone lines, and a switch means for said telephone answering machine, operable by said control means, to disconnect the telephone answering machine to prevent it from recording Touch Tone messages and synthesized voice reports.

3. An integrated security and Touch Tone telephone system for a premises which allows the security system to be accessed through a Touch Tone telephone, as claimed in claim 2, said control means counting the number of ring signals received over the outside telephone lines by which the on-premises telephone is being contacted by an off-premises telephone, and then, after counting a given number of rings, answering the on-premises telephone by actuating a switching means to allow the user of the off-premises telephone to dial Touch Tone encoded instructions into the integrated system and receive voice synthesized reports from the integrated system, and said control means, upon receiving a Touch Tone encoded instruction to disconnect the telephone answering machine, actuating said answering machine switch means to disconnect the answering machine to prevent it from recording Touch Tone instructions and synthesized voice reports.

4. An integrated security and Touch Tone telephone system for a premises which allows the security system to be accessed through a Touch Tone telephone, as claimed in claim 1, further including a synthesized speech and Touch Tone transfer transformer and a synthesized speech and Touch Tone transfer transformer switching means, controlled by said control means, for connecting said Touch Tone and synthesized speech transfer transformer across the outside telephone lines to allow Touch Tone input signals to be transferred from the outside telephone lines to said Touch Tone decoder means, and to allow synthesized speech reports to be transferred from said speech synthesizer to the outside telephone lines.

5. An integrated security and Touch Tone telephone system for a premises which allows the security system to be accessed through a Touch Tone telephone, as claimed in claim 1, said control means including a processor coupled to said alarm system, said speech synthesizer, said ring detector means, said Touch Tone decoder means, said off-hook detecting means, and said internal power supply switching means.

6. An integrated security and Touch Tone telephone system for a premises which allows the security system to be accessed through a Touch Tone telephone, as claimed in claim 1, further including a plurality of auxiliary relays for auxiliary systems to be operated by the integrated system in dependence upon the received Touch Tone encoded input instructions.

7. An integrated security and Touch Tone telephone system for a premises which allows the security system to be accessed through a Touch Tone telephone, as claimed in claim 1, said voice synthesizer including a PROM circuit which is selectively programmed to reflect the particular premises protected by the security system, such that the synthesized voice reports can be programmed to describe particular attributes of the premises in the audible reports.

8. A combined security and Touch Tone telephone system for a premises which allows the security system to be accessed through a Touch Tone telephone comprising:
   a. an on-premises Touch Tone telephone for the premises for connection by on-premises telephone lines to outside telephone lines during normal usage of the on-premises Touch Tone telephone, with the integrated security and Touch Tone telephone system being coupled by on-premises telephone lines to the on-premises Touch Tone telephone, and to the outside telephone lines;
   b. a security system for detecting an alarm condition at the premises, such as an unauthorized intrusion or a fire, with the combined security and Touch Tone telephone system being coupled to said security system for monitoring the status thereof;
   c. a telephone answering machine connectable to the outside telephone lines, and a switch means for disconnecting the telephone answering machine from the outside telephone lines;
   d. a Touch Tone decoder means, coupled by on-premises telephone lines to the on-premises Touch Tone telephone, and to the outside telephone lines, for decoding telephone Touch Tones which are received thereby, to allow a Touch Tone telephone, either the on-premise Touch Tone telephone or other Touch Tone telephones coupled over the outside telephone lines, to be utilized to access and control the security system;
   e. a ring detector means for detecting the presence of a ring signal across the outside telephone lines;
   f. a control means for the combined security and Touch Tone telephone system, said control means being coupled and responsive to said Touch Tone decoder means and also to said ring detector means, and said control means counting the number of ring signals received over the outside telephone lines by which the on-premises telephone is being contacted by an other Touch Tone telephone coupled over the outside telephone lines, and then, after counting a first given number of rings, answering the on-premises telephone by actuating a switching means to allow the user of the other Touch Tone telephone to dial Touch Tone encoded instructions into the integrated system, said telephone answering machine being set to answer the on-premises telephone after a second given number of rings, less that said first given number of rings, and said control means, upon receiving a Touch Tone encoded instruction to disconnect the telephone answering machine, actuating said answering machine switch means to disconnect the telephone answering machine to prevent it from recording signals.

* * * * *